(12) United States Patent
Hentosz

(10) Patent No.: US 7,954,195 B2
(45) Date of Patent: Jun. 7, 2011

(54) BEATER CLEANER

(76) Inventor: Jody Elizabeth Hentosz, Akron, OH (US)

( * ) Notice: Subject to any disclaimer, the term of this patent is extended or adjusted under 35 U.S.C. 154(b) by 924 days.

(21) Appl. No.: 11/903,685

(22) Filed: Sep. 25, 2007

(65) Prior Publication Data

US 2009/0080286 A1 Mar. 26, 2009

(51) Int. Cl.
*A47J 43/07* (2006.01)
(52) U.S. Cl. .......................................... 15/111; 15/214
(58) Field of Classification Search .................. 15/107, 15/214, 111, 245; 366/309
See application file for complete search history.

(56) References Cited

U.S. PATENT DOCUMENTS

| | | | | |
|---|---|---|---|---|
| 2,283,686 | A | * | 5/1942 | McCune ........................ 601/140 |
| 4,750,771 | A | * | 6/1988 | Emmett et al. ................ 294/99.2 |
| 7,249,793 | B1 | * | 7/2007 | Jabr ................................ 294/16 |

* cited by examiner

*Primary Examiner* — Shay L Karls

(57) ABSTRACT

Beater Cleaner is a kitchen gadget designed to clean beaters or other similarly shaped products. It consists of tongs that allow squeegee like devices on the ends of each tong to grip the blades of a beater or other similarly shaped object. To use the preferred embodiment of Beater Cleaner, a user uses his thumb and index finger to grab the flexible tongs at the finger grips. He can then tighten or loosen the tongs to fit over various sized and shaped beaters. The rubber squeegees are placed around the beater and the user can scrape the ingredients stuck on the beater into a mixing bowl to insure the maximum amount of ingredients is saved. The user can then use the brush on the opposite end from the squeegees to clean between the blades of the beater.

13 Claims, 1 Drawing Sheet

BEATER CLEANER

CROSS REFERENCE TO RELATED APPLICATIONS

This United States Non-Provisional patent application does not claim priority to any United States Provisional patent applications or any foreign patent applications.

FIELD OF THE DISCLOSURE

The disclosures made herein related generally to the kitchen accessories industry. The Invention discussed herein is in the general classification of beater and mixer cleaners.

BACKGROUND

Many large and small businesses and even individuals rely on baked goods to provide income. Some simply bake for fun or to provide food for their family. Often, baking requires the use of a hand or electric mixer. These mixers use beaters with a plurality of blades to stir batter or other ingredients. Cleaning such oddly shaped beaters has been an ongoing problem for all who bake. Batter and other ingredients cling to the beater forcing the user to either use his hands to scrape the ingredients into a bowl, possibly contaminating the food in the process, or to waste the ingredients that stick to the beater. Cleaning a beater after use is also a time consuming process as each blade of the beater must be hand cleaned.

Hence, there is a need in the art for a convenient, inexpensive, durable and effective device for cleaning beaters or other similarly shaped cooking devices without touching the beater and without wasting the batter or other ingredients stuck to the beater.

SUMMARY OF THE DISCLOSURE

Beater Cleaner is a kitchen gadget designed to clean beaters or other similarly shaped products. It consists of tongs that allow squeegee like devices on the ends of each tong to grip the blades of a beater or other similarly shaped object.

The principal object of this invention is to provide a device that can be used to remove batter or ingredients from a beater or other similar type device to prevent waste of the batter or ingredients.

Another object of this invention is to provide a device that can be used to clean a beater or other similar type device without the need to directly touch the blades of the beater.

Another object of this invention is to provide a device that can be easily used to remove ingredients from a beater.

Another object of this invention is to provide an affordable device for removing ingredients from a beater.

Another object of this invention is to provide a device that efficiently cleans a beater to reduce the amount of time consumed in cleaning and storing a beater.

Another object of this invention is to provide a durable device for removing ingredients from a beater.

DETAILED DESCRIPTION OF THE DRAWING

The preferred embodiment of Beater Cleaner is comprised of at least some of the following: flexible tongs, a pair of finger grips on each of the tongs, a pair of rubber squeegees at the end of each of the tongs, and a handle connected to the tongs with a brush on one end.

Figure 1:
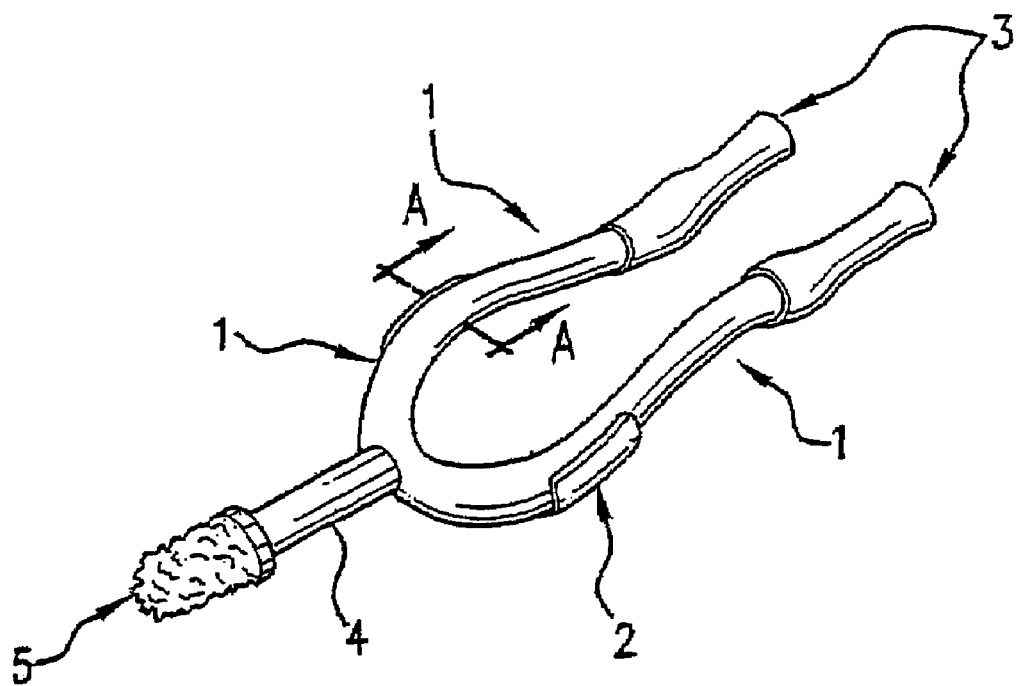
FIG. 1 depicts a perspective view of the preferred embodiment of the present invention.

FIG. 1 shows the preferred embodiment of the present invention. Flexible tongs 1 made of plastic or metal are arranged in a U-shape. Finger grips 2 are located on the outside and top of the tongs 1 near where the tongs 1 connect. These finger grips 2 are made of rubber in the preferred embodiment though a variety of materials could be substituted. The finger grips 2 are approximately one inch in length and half inch in width though a variety of dimensions could be utilized. The finger grips 2 provide a better and more comfortable grip for the user.

At the open end of the tongs 1, a rubber squeegee 3 is located on each tong 1. The rubber squeegee 3 completely surrounds the tongs 1 and extends approximately one and a half inches up the tongs 1 in the preferred embodiment though a variety of other arrangements and dimensions may also be utilized.

The tongs 1 are approximately three inches in length and one inch apart with a diameter of one inch in the preferred embodiment. A handle 4 connects to the top of the tongs 1 at the closed end. The handle 4 is also approximately one inch in diameter and made of plastic or metal in the preferred embodiment. The handle 4 is four inches in length though a variety of other lengths would also be appropriate. A brush 5 made of bristles is located at the end of the handle 4, opposite the connection with the tongs 1. Other materials such as sponge or cloth may be used for the brush provided they are capable of cleaning a kitchen utensil.

Figure 2:
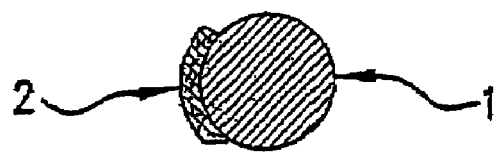
FIG. 2 depicts a cross-sectional view of the preferred embodiment of the invention cut along the line A-A of FIG. 1.

FIG. 2 depicts a cross-sectional view of the preferred embodiment of the invention cut along the line A-A of FIG. 1. One of the tongs 1 and one of the finger grips 2 can be seen in greater detail. The relative thicknesses of these components can be seen for the preferred embodiment. The tongs 1 have a one inch diameter while the finger grips 2 are approximately one-eighth of an inch thick.

To use the preferred embodiment of Beater Cleaner, a user uses his thumb and index finger to grab the flexible tongs at the finger grips. He can then tighten or loosen the tongs to fit over various sized and shaped beaters. The rubber squeegees are placed around a beater and the user can scrape the ingredients stuck on the beater into a mixing bowl, insuring the maximum amount of ingredients is conserved. The user can then use the brush on the opposite end from the squeegees to clean between the blades of the beater.

The plastic used in the production will ideally be selected for durability and longevity. Thermoplastics are commonly used in the manufacturing of components similar to those used in this invention. Polyethylene, polypropylene, and other similar thermoplastic materials would be among those with the necessary traits. Members of this family are recognized universally as being versatile and of high quality.

The plastic components of Beater Cleaner can also be formed with the use of plastic molding techniques, such as injection molding or blow molding. Injection molding requires melted plastic to be forcefully injected into relatively cool molds. As the plastic begins to harden, it takes on the shape of the mold cavity. This technique is ideal for the mass production of products. Alternatively, blow molding, a form of extrusion, could be utilized. Blow molding involves a molten tube being pushed into a mold. Compressed air then forces the molten tube against the cold walls of the mold.

It should be obvious that the components of the present invention can be of various shapes and sizes. It should also be obvious that the components of the invention can be made of different types of plastics or other suitable materials and can be of any color.

It will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as set forth in the claims.

What is claimed is:

1. A kitchen device comprising:
   (a) a first tong and a second tong,
   (b) a cleaning mechanism on the end of the first tong and the second tong,
   (c) a handle connected to the first tong and the second tong; and
   (d) a brush located on the handle opposite the first tong and the second tong.

2. The device of claim 1 wherein the first tong and the second tong are connected in a U shape.

3. The device of claim 1 wherein the first tong and the second tong are made of metal.

4. The device of claim 1 wherein the first tong and the second tong are made of plastic.

5. The device of claim 1 wherein a first finger grip is located on the first tong and a second finger grip is located on the second tong.

6. The device of claim 5 wherein the first finger grip and the second finger grip are made of rubber.

7. The device of claim 1 wherein the cleaning mechanism is a rubber squeegee.

8. The device of claim 1 wherein the first tong and the second tong are approximately three inches in length and one inch apart and have a diameter of approximately one inch.

9. The device of claim 1 wherein the handle is made of metal.

10. The device of claim 1 wherein the handle is made of plastic.

11. The device of claim 1 wherein the brush has a set of bristles.

12. The device of claim 1 wherein the brush has a sponge.

13. A kitchen device comprising:
    (a) a first tong made of plastic and a second tong made of plastic connected in a U-shape;
    (b) a first rubber squeegee located on the end of the first tong and a second rubber squeegee located on the end of the second tong;
    (c) a first rubber finger grip located on the outside of the first tong and a second rubber finger grip located on the outside of the second tong;
    (d) a handle made of plastic connected to the first tong and the second tong opposite the first rubber squeegee and the second rubber squeegee;
    (e) a brush with a set of bristles located on an end of the handle.

* * * * *